No. 770,374. PATENTED SEPT. 20, 1904.
E. A. LAUGHON.
NUT LOCK.
APPLICATION FILED JUNE 10, 1904.
NO MODEL.

Witnesses
E. F. Stewart
C. N. Woodward

Eugene A. Laughon,
Inventor.

by ____
Attorney

No. 770,374.

Patented September 20, 1904.

UNITED STATES PATENT OFFICE.

EUGENE ALVIN LAUGHON, OF ROANOKE, VIRGINIA.

NUT-LOCK.

SPECIFICATION forming part of Letters Patent No. 770,374, dated September 20, 1904.

Application filed June 10, 1904. Serial No. 212,217. (No model.)

*To all whom it may concern:*

Be it known that I, EUGENE ALVIN LAUGHON, a citizen of the United States, residing at Roanoke, in the county of Roanoke and State of Virginia, have invented a new and useful Nut-Lock, of which the following is a specification.

This invention relates to devices for preventing nuts from rotating backwardly upon bolts, and has for its object to simplify and improve the construction and increase the efficiency without decreasing the strength or holding power of the nut or bolt.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportion, and general assemblage of the parts may be resorted to without departing from the principle of the invention or sacrificing any of its advantages, and the right is therefore reserved of making all the changes and modifications which fairly fall within the scope of the invention and the claim made therefor.

Figure 1:
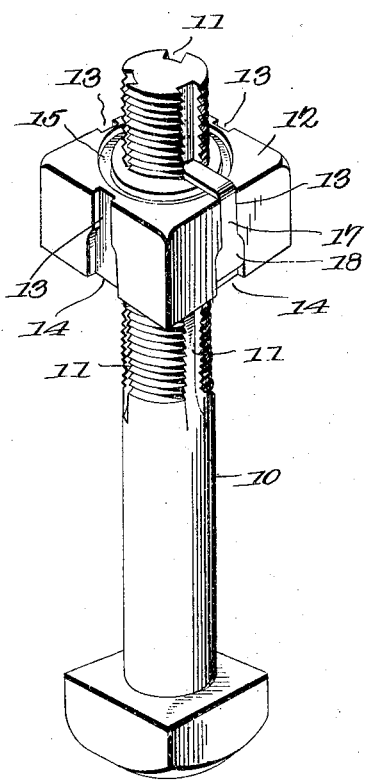
Figure 2:
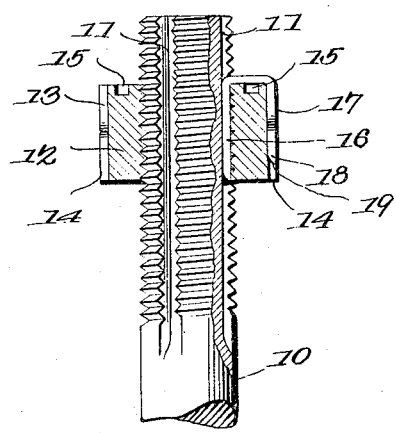
Figure 3:
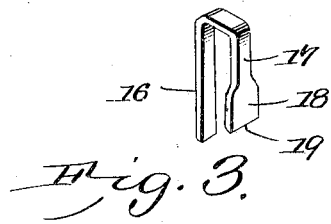

In the drawings thus employed, Figure 1 is a perspective view of the improved device applied. Fig. 2 is a vertical sectional elevation of the same. Fig. 3 is a perspective view of the locking-key disconnected.

The bolt 10 is provided with one or more longitudinal grooves 11 transversely of its threads, and the nut 12 is provided with one or more recesses 13 in its outer sides, each recess enlarged laterally at the lower portion, as at 14, and the nut also preferably provided with an annular channel 15 in its upper face concentric to its threaded aperture. By providing a plurality of the grooves 11 and recesses 13 provision is made for locking the nut at frequent intervals in its rotation, as will be hereinafter explained.

A locking-key is provided of resilient or malleable material substantially in U shape, with one leg portion, 16, for entering one of the bolt-grooves 11 and the other leg portion, 17, for entering the recesses 13 and with its terminal enlarged laterally, as at 18, to correspond to the enlargement 14 of the recess and to enter the same when positioned upon the nut and bolt. The inner face of the enlarged end 18 of the locking-key is cut away or inclined, as shown at 19, to assist in inserting it when the key is to be applied.

In operating the device the nut 12 is first turned "home" in the usual manner upon the bolt and left with one of the recesses 13 opposite one of the channels 11 in the bolt 10. The leg 16 of the locking-key is then thrust into this channel 11, with the other leg, 17, and its enlargement 18 above the opposite recess 13. Then by striking the upper end of the key a light blow with a hammer, wrench, or other suitable or convenient implement it will be forced over the nut until the enlargement 18 "springs" into the enlarged portion 14 of the recess, the inclined side 19 of the extremity of the key facilitating this action, as will be obvious. By this simple means the nut is firmly and quickly locked from turning in either direction upon the bolt. To release the key, an implement of proper form will be inserted in the channel 15 beneath the key and employed as a pry to force it outward, and at the same time the enlarged end 18 is forced outward from the recess by another tool. The key will yield to pressure, but will not be accidentally released, the enlarged end by engagement in the recess being sufficient to prevent its removal by any pressure to which it will be subjected when in use.

The device may be applied to any size or form of nut, and by providing a plurality of the grooves 11 and recesses 13 the nut can be locked by rotating to a comparatively slight degree only, as will be obvious. The locking-key may be of steel, malleable iron, or other suitable metal possessing the requisite strength and yieldableness.

Having thus described the invention, what is claimed is—

In a nut-lock, a threaded bolt having one or more longitudinal grooves transversely of its threads, a nut having an annular channel in its outer face and with one or more exterior recesses longitudinally of the same and enlarged at one end, and a resilient locking-key substantially in U shape with one leg for entering one of the grooves in the bolt and the other leg enlarged for entering one of the recesses in the nut and the enlargement of the same.

In testimony that I claim the foregoing as my own I have hereto affixed my signature in the presence of two witnesses.

EUGENE ALVIN LAUGHON.

Witnesses:
W. J. BLOCK,
D. V. CONN.